United States Patent
Kawai

[19]

[11] Patent Number: 5,949,829
[45] Date of Patent: Sep. 7, 1999

[54] CENTRAL ERROR DETECTING CIRCUIT FOR FSK RECEIVER

[75] Inventor: Kazuo Kawai, Tokyo, Japan

[73] Assignee: General Research of Electronics, Inc., Tokyo, Japan

[21] Appl. No.: 08/825,002

[22] Filed: Mar. 26, 1997

[30] Foreign Application Priority Data

Nov. 29, 1996 [JP] Japan .................................. 8-334515

[51] Int. Cl.$^6$ .................................................. H04L 27/14
[52] U.S. Cl. .......................... 375/334; 375/317; 329/300
[58] Field of Search ................... 375/272–278, 375/285, 317, 319, 334–337, 344, 346; 329/300, 301; 327/307

[56] References Cited

U.S. PATENT DOCUMENTS

| | | | |
|---|---|---|---|
| 4,318,617 | 3/1982 | Orsen ....................................... | 356/373 |
| 4,500,837 | 2/1985 | Shuey et al. ............................. | 324/102 |
| 5,233,312 | 8/1993 | Duft et al. ................................ | 330/259 |
| 5,436,590 | 7/1995 | Simard et al. ........................... | 329/303 |
| 5,663,989 | 9/1997 | Fobbester ................................ | 375/344 |

*Primary Examiner*—Young T. Tse
*Attorney, Agent, or Firm*—Trexler, Bushnell, Giangiorgi & Blackstone, Ltd.

[57] ABSTRACT

A demodulated baseband signal of a bit synchronization signal which has been FSK modulated, because it was transmitted with a narrow frequency band, is usually in the form of a sine wave on which a DC drift is superposed. Since this DC offset will cause bias distortion for transmission codes, it is needed to detect this offset component at higher speed and with a simpler manner as soon as signal incoming occurs and to correct this. This invention attains this by providing a center error detecting circuit for an FSK signal receiver comprising: sampling means for sampling the bit synchronization signal of a demodulated FSK baseband signal by two sampling pulses separated mutually by the reciprocal of the transmission rate in bits per second; and means for finding the mean value of the two samples thus obtained, so as thereby to provide the DC center level of the baseband signal.

4 Claims, 2 Drawing Sheets

CENTRAL ERROR DETECTING CIRCUIT FOR FSK RECEIVER

FIELD OF THE INVENTION

This invention relates to a center level error detecting circuit for a demodulated baseband signal, said center level error being caused by a frequency error or the like, said center level error detecting circuit being adapted to be used for an FSK (Frequency Shift Keying) signal receiver for receiving a signal which has been modulated with a packet type digital signal by using an FSK modulation system.

BACKGROUND OF THE INVENTION

The FSK modulated signal is signal carrying digital information to be transmitted through a frequency modulation, and therefore if there is a frequency error in the modulated signal received in a receiver, bias distortion can be introduced in a demodulated signal. Therefore, in order to avoid this, an error of the center level of the demodulated baseband signal, that is a DC offset component which has been introduced by the frequency error, needs to be detected and the frequency error to through an AFC (Automatic Frequency Control) so that the detected DC offset component is made zero, or a correction must be carried out so that this error is cleared away by using the baseband signal. Whit regard to either method, in the case where a packet is short in length, bit synchronization and frame synchronization must be established as soon as the signal was received, and for this purpose the effect of this frequency error must be corrected, prior to these synchronizing operations. In order to carry out the bit synchronization, there are in general two methods, one using squaring/band-pass filtering, the other directly driving a DPLL (Digital Phase Locked Loop) with the baseband signal. In the former method, a DC offset can become irrelevant, but it needs a relatively long processing time, which means that this method is not suitable for a faster operation. Therefore, the latter method is utilized usually for this purpose. Since it must use a center level detecting system, various such systems have been developed in the prior art. Typical examples of the prior art center level detecting systems which are used in connection with a demodulated baseband signal are as follows.

In a first center level detecting system, positive and negative peak values of the bit synchronization signal are detected, and a center level error, that is a DC offset component, is found from the mean value of these detected positive and negative peak values. In a second center level detecting system, a new synchronization signal component is formed from the original synchronization signal which includes a DC offset, the DC component of said newly formed synchronization signal component having been removed, said formed synchronization signal component having the same amplitude as that of the original synchronization signal and its phase reversed to that of the original synchronization signal, and the newly formed synchronization signal component is added to the original signal to cancel the synchronization signal component, so as thereby to pick up only the DC offset component which has been included in the original signal. In a third center level detecting system, a DC offset component is detected by comparing the demodulated baseband signal with its rect-angularly shaped signal having the same amplitude. In the first and second systems it is not necessary to use a smoothing circuit, but the third system does require it, and therefore the first two systems are faster than the third system. Since transient phenomenon is produced in an AC coupling circuit and a phase shifting circuit of the second system, the first system is faster than the second system. Therefore, the first center level detecting system can be said to be the fastest system of the three.

SUMMARY OF THE INVENTION

This invention detects a DC offset component, that is a center level error in the demodulated baseband signal, on the basis of a technical idea which is quite different from the above-mentioned prior art detecting systems and does so by using extremely simple means. With an output from the detecting means according to this invention, it is possible to correct a frequency error by an AFC, and it is also possible to correct bias distortion of the baseband signal by the baseband signal itself. This invention provides a center level error detecting circuit for this purpose.

Since the bit synchronization signal is transmitted with a narrow band generally, a demodulated baseband signal becomes a sine wave on which any frequency error may be superimposed as a DC offset. An object of this invention is to detect only the DC offset component from such demodulated baseband signal irrelevantly to the sine wave, in a simpler and faster manner.

The bit synchronization signal in the baseband signal is a sine wave of 4,800 Hz in the case where the data rate is 9,600 bps. This sine wave has a shape repeated at a period of 1/4,800 sec, that is as 360°, and therefore the difference of instantaneous phase between two points separated by 1/9,600 sec is 180°. Accordingly, the values of two samples taken at two time points separated by 1/9,600 sec in this signal are located at respective positions which are symmetric to each other with respect to the center level. This means that the mean value of these two sample values corresponds to the center level. Therefore, this invention attains the above-mentioned object by finding the mean value of two sample values at two respective time points which are separated by 1/9,600 sec.

Other objects, features and advantages of the invention will become apparent from a reading of the specification, when taken in conjunction with the drawings, in which like reference numerals refer to like elements in the views.

DESCRIPTION OF THE PREFERRED EMBODIMENTS

Figure 1:
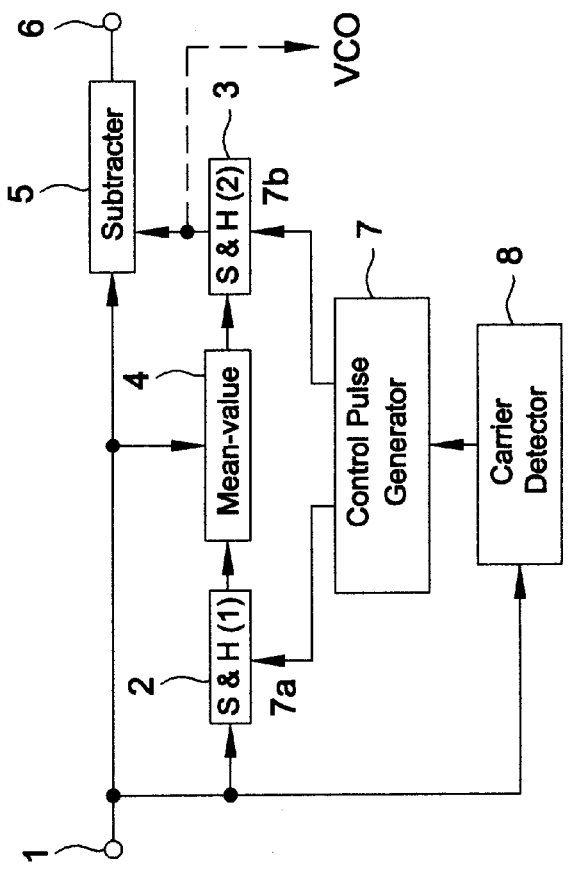
FIG. 1(a) and FIG. 1(b) illustrate circuit block diagrams with which the principle of this invention and the configurations of embodiments according to this invention are explained; and FIG. 2(a)
Figure 1:
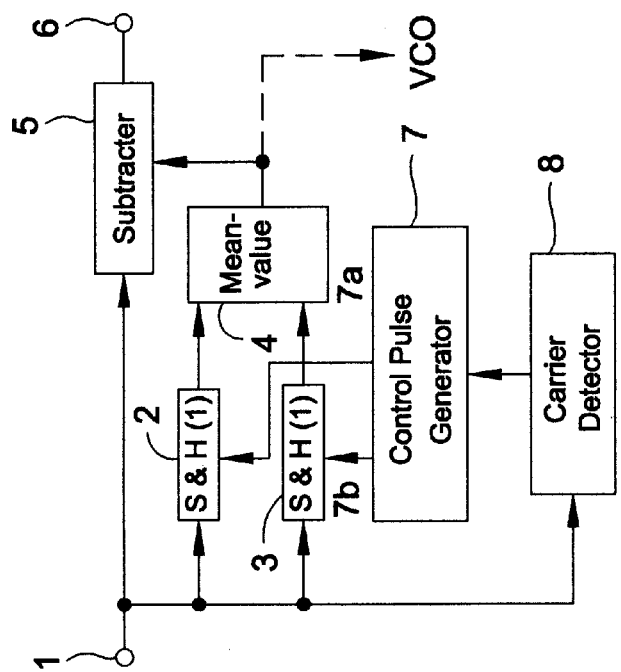

FIG. 1 shows embodiments according to this invention and the principle of this invention will be explained with reference thereto. The embodiments shown in FIG. 1(a) and FIG. 1(b) are substantially the same in principle. In FIG. 1, same reference numerals are given to elements having the same function.

In FIG. 1(a), reference numeral 1 identifies an input terminal to which a demodulated baseband signal is applied. The demodulated baseband signal at the input terminal 1 is coupled to the inputs of a first sample/hold circuit 2, a second sample/hold circuit 3, a subtracter 5 and a carrier detector 8, respectively. The output of the carrier detector 8 is connected to the input of a control pulse generator 7, a first output 7a of which is coupled to the other input of the first sample/hold circuit 2, and a second output of which is coupled to the other input of the second sample/hold circuit 3. The outputs of the two sample/hold circuits 2 and 3 are coupled to a mean-value calculator 4, the output of which is provided as an input to a VCO or is applied to the subtracter 5 as its second input. The output of the subtracter 5 is coupled to an output terminal 6 as a corrected output signal.

In FIG. 1(b), reference numeral 1 identifies an input terminal to which a demodulated baseband signal is applied. The demodulated baseband signal at the input terminal 1 is coupled to the inputs of a first sample/hold circuit 2, a mean-value calculator 4, a subtracter 5 and a carrier detector 8. The output of the carrier detector 8 is connected to the input of a control pulse generator 7, a first output 7a of which is coupled to the other input of the first sample/hold circuit 2, and a second output of which is coupled to a first input of a second sample/hold circuit 3. The output of the first sample/hold circuits 2 is coupled to the other input of the mean-value calculator 4, of which output is coupled to the other input of the second sample/hold circuit 3, the output of which is provided as an input to a VCO or is applied to the subtracter 5 as its second input. The output of the subtracter 5 is coupled to an output terminal 6 as a corrected output signal.

Figure 2:
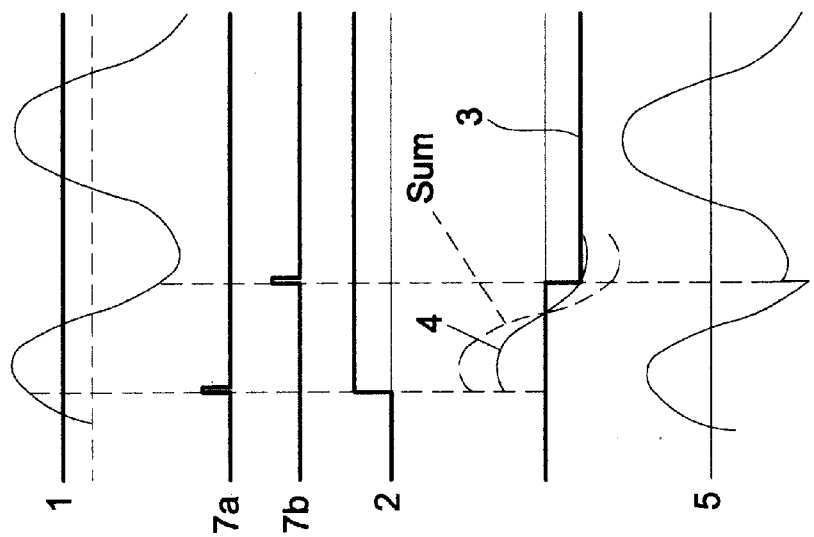
FIG. 2(b) illustrates waveforms at various points in the circuits in FIG. 1(a) and FIG. 1(b), respectively, for explaining their operation.
Figure 2:
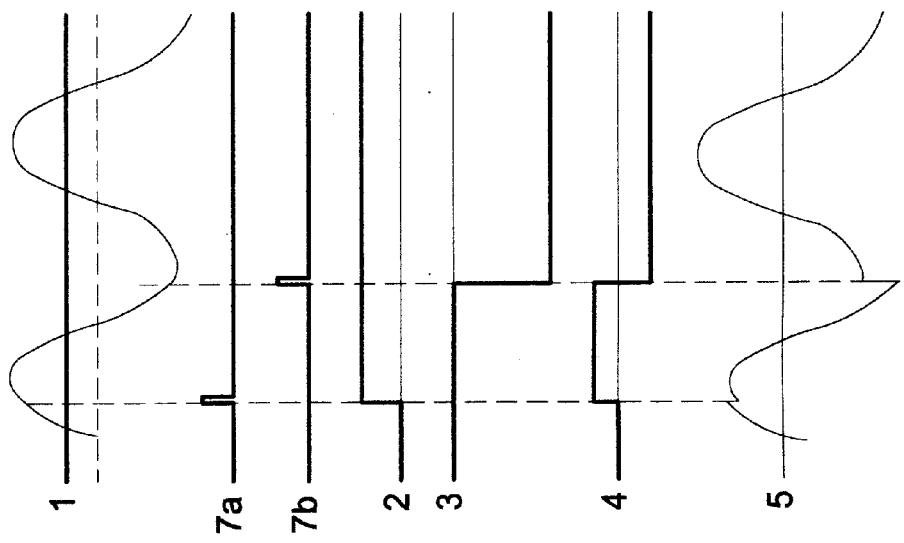

FIG. 2(a) and FIG. 2(b) show waveforms used to explain the operations of the circuits in FIG. 1(a) and FIG. 1(b), respectively. In FIG. 2(a) or FIG. 2(b), a waveform 1 identifies the demodulated baseband signal at the input terminal 1, a waveform 7a the first output of the control pulse generator 7, a waveform 7b the second output of the control pulse generator 7, a waveform 2 the output of the first sample/hold circuit 2, a waveform 3 the output of the second sample/hold circuit, a waveform 4 the output of the mean-value calculator 4, and a waveform 5 the output of the subtracter 5, that is the corrected output signal.

First, the embodiment shown in FIG. 1(a) will be explained with reference to the waveforms shown in FIG. 2(a). The bit synchronization signal in the form of a sine wave which was input to the baseband signal input terminal 1 is applied to the subtracter 5, the first and second sample/hold circuits 2 and 3, and the carrier detector 8, respectively. It is assumed in this case that this signal has been offset slightly to the negative, as shown in the waveform 1 in FIG. 2(a). The carrier detector 8 does not function to determine directly whether there is a carrier, but works as a so-called squelch which utilizes such a general feature in a frequency modulation system that the noise level in the baseband increases particularly in the case of the absence of the carrier. The detection of the reception of the signal by means of this circuit actuates the control pulse generator 7 so that it generates a pulse 7a and a pulse 7b which are separated by 1/9,600 sec mutually, on the output lines 7a and 7b of the control pulse generator 7, respectively. These pulses 7a and 7b are supplied to the first and second sample/hold circuits 2 and 3, respectively, and these circuits are used to sample the input signal shown in the waveform 1 at the timings of these pulses 7a and 7b, respectively, and hold their sampled levels as shown in the waveforms 2 and 3, respectively. The mean-value calculator 4 receives these two outputs of the sample/hold circuits 2 and 3, and carries out a mean finding operation on these two inputs, that is they are added to each other and the resultant sum is halved to obtain the mean value of the input waveforms 2 and 3. The mean-value calculator 4 provides the output shown in the waveform 4, which identifies a DC offset component. This output from the mean-value calculator 4 may be applied to the subtracter 5 so that this offset component is subtracted from the baseband input signal. Therefore, at the output of the subtracter 5, that is the corrected signal output terminal 6, an output with no offset component, of which bias distortion has been thus corrected, is obtainable as is shown in the waveform 5.

Also, otherwise, in the case where the AFC is utilized, the offset component at the output of the mean-value calculator 4 is not supplied to the subtracter 5, but is coupled to control the VCO (Voltage Controlled Oscillator), as is shown by a dotted line in FIG. 1(a). The holding condition for the sample levels on the outputs of the sample/hold circuits 2 and 3, as shown in the waveforms 2 and 3, may be maintained during the period of the packet, as they are, in either case of the distortion correction or the control by the AFC.

The embodiment shown in FIG. 1(b) will be now explained with reference to the waveforms shown in FIG. 2(b). The bit synchronization signal in the form of a sine wave which was input to the baseband signal input terminal 1 is applied to the subtracter 5, the first sample/hold circuits 2, the mean-value calculator 4 and the carrier detector 8. It is also assumed in this case that this signal has been offset slightly to the negative, as shown in the waveform 1 in FIG. 2(b). The control pulse generator 7 generates, in response to the operation of the carrier detector 8, a pulse 7a and a pulse 7b which are separated by 1/9,600 sec mutually, on the output lines 7a and 7b of the control pulse generator 7, respectively, in the same way as the control pulse generator 7 shown in FIG. 1(a). These pulses 7a and 7b are supplied to the first and second sample/hold circuits 2 and 3, respectively. The first sample/hold circuit 2 generates the waveform 2 in response to the pulse 7a, in the same manner as the first sample/hold circuit 2 in FIG. 1(a). The mean-value calculator 4 which receives the baseband sine signal in the waveform 1 and the output of the first sample/hold circuit 2 carries out the operation finding the mean value of these two inputs (that is, these two inputs are added each other and the resulting sum is halved at real-time). The waveform 4 in FIG. 2(b) identifies the result of this operation. The mean value thus found is applied to the second sample/hold circuit 3 as the input thereto, and is sampled and held therein in response to the pulse 7b from the control pulse generator 7. The waveform 3 in FIG. 2(b) denotes the output of the second sample/hold circuit 3 which also identifies a DC offset component. This may be applied to the subtracter 5 so that this offset component is subtracted from the baseband input signal. Therefore, at the output of the subtracter 5, that is the corrected signal output terminal 6, an output with no offset component, of which bias distortion has been thus corrected is obtainable as is shown in the waveform 5 in FIG. 2(b). The signal shown in the waveform 3 may be used to constitute an AFC as has been mentioned in connection with FIG. 1(a).

As has been explained in detail, in accordance with this invention, since a DC offset component can be obtained directly from the mean value of two samples of the demodulated bit synchronization signal, which were obtained at two timings, respectively, separated by the time corresponding to the reciprocal of the transmission rate, it is easy to correct an offset component with the baseband signal by using the held values of these samples, or to constitute an AFC by feeding it back to the VCO.

While there have been shown and described preferred embodiments, it is to be understood that various other adaptations and modifications may be made within the spirit and scope of the invention.

What is claimed is:

1. A center error detecting circuit for an FSK signal receiver having a demodulator which provides a baseband signal with a bit synchronization signal component in the form of a sine wave including a DC offset, comprising:

means for generating first and second sampling pulses, said first sampling pulse advanced in time by a half-period of said sine wave with respect to said second sampling pulse;

first sampling means coupled to receive the bit synchronization signal component of the baseband signal for sampling the bit synchronization signal component in response to said first sampling pulse to generate a first level corresponding to a sampled value;

means coupled to receive said bit synchronization signal component and said first level for finding a mean value thereof to provide an averaged bit synchronization signal component; and second sampling means coupled to receive said averaged bit synchronization signal component for sampling the averaged bit synchronization signal component in response to said second sampling pulse to provide a signal which denotes the center level of said bit synchronization signal component of the baseband signal.

2. The center error detecting circuit as claimed in claim 1, further comprising:

means for correcting a DC offset error of the baseband signal by using a denoting signal from said second sampling means.

3. The center error detecting circuit as claimed in claim 1, wherein said first and second sampling means comprise sample/hold circuits.

4. The center error detecting circuit as claimed in claim 1, wherein said sampling pulse generating means comprises:

means coupled to receive the baseband signal for detecting the presence of the bit synchronization signal component and providing a carrier indicating signal; and means for generating said first and second sampling pulses in response to said carrier indicating signal.

* * * * *